Oct. 13, 1936.  H. J. KIRSCHNER ET AL  2,057,151
RATIO CONTROL FOR TRANSMISSION MECHANISM
Filed April 26, 1935  4 Sheets-Sheet 2

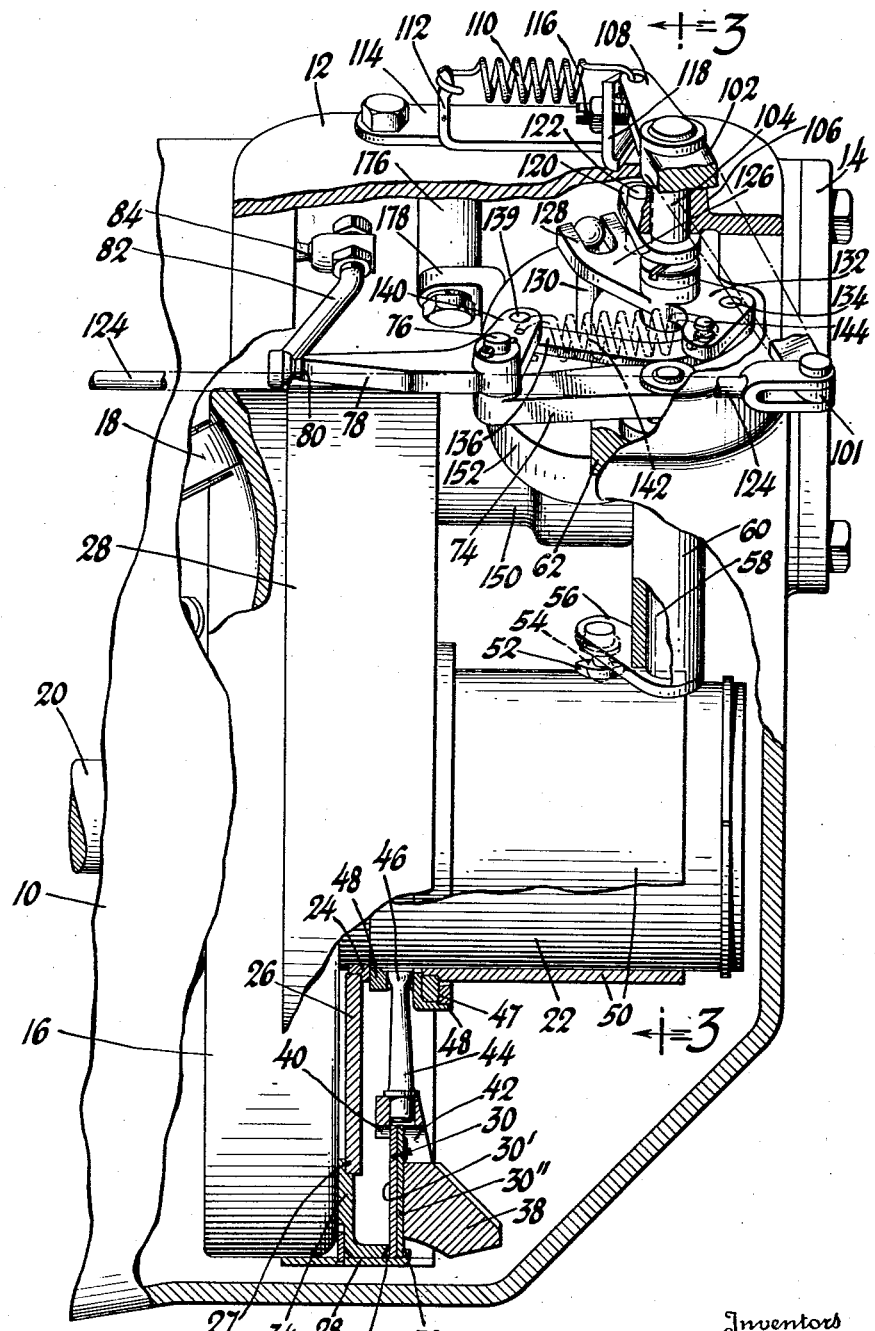

Inventors
Henry J. Kirschner &
Winfield D. Gove.
By Blackburn, Spencer & Flint
Attorneys Oct. 13, 1936.  H. J. KIRSCHNER ET AL  2,057,151
RATIO CONTROL FOR TRANSMISSION MECHANISM
Filed April 26, 1935  4 Sheets-Sheet 4

Inventors
Henry J. Kirschner &
Winfield D. Gove.

By Blackmore, Spencer & Flink
Attorneys

Patented Oct. 13, 1936

2,057,151

UNITED STATES PATENT OFFICE 2,057,151

RATIO CONTROL FOR TRANSMISSION MECHANISM

Henry J. Kirschner and Winfield D. Gove, Detroit, Mich., assignors to General Motors Corporation, Detroit, Mich., a corporation of Delaware Application April 26, 1935, Serial No. 18,426

15 Claims. (Cl. 74—472)

This invention relates to mechanism for controlling and varying the ratio of a variable speed power transmission mechanism. It is designed particularly for use in variable speed power transmission mechanisms of race and roller type.

It has already been proposed to control the ratio of variable speed power transmission mechanisms through the influence of the muscular efforts of the operator and the movements of a device responsive to the velocity of some part of the power train.

It is an object of this invention to simplify and improve the operation of control mechanisms of this type.

The invention comprises a ratio changing device, a governor, shown as adapted to be driven by a power output element of the transmission, operating in response to increasing speed to move the ratio changing device so as to "shift up", or tilt the rollers into a higher ratio position, and means responsive to operator control tending by elastic force to move the ratio changing device so as to "shift down" or tilt the rollers into a lower ratio position. Both governor and operator control are applied to the ratio changing device through the intermediary of a differential lever. An important feature of the invention is embraced in a spring connection between the differential lever and an operator controlled lever linked thereto, said spring fulfilling the functions both of a power spring operating to shift down to lower ratio when released by the operator's control and of a lash take-up to obviate the ill effects of loose connections. The spring and associated parts as described are so disposed as not to increase the required shift efforts of the governor; and by taking up the lash, tendency of the rollers to hunt during ratio changing is avoided, and incidentally there is obviated the necessity of placing fine tolerances on the fit of pin and hole connections. A dashpot is arranged to retard too rapid shifting movements made by the operator. Means are also present to cushion movements of extreme governor speed when the rollers have reached the limit of tilt to high ratio positions, and the tension of the power spring described is utilized for this purpose.

In the accompanying drawings, in which like reference characters indicate like parts throughout the several views:

Fig. 1 is a view, partly in side elevation and partly in section, of a transmission casing broken away and exposing the transmission-connected end of a ratio control mechanism adapted to adjust and regulate the ratio position of the rollers of a race and roller transmission mechanism, and of an output speed-responsive governor adapted to influence said mechanism;

Figure 1A:
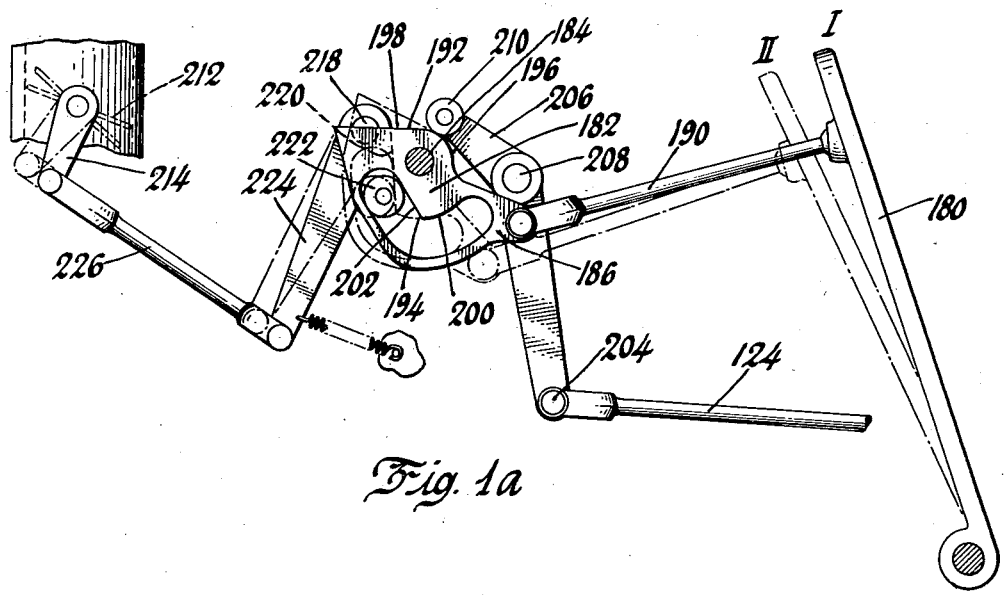
Fig. 1a is a diagrammatic illustration of the operator-actuated end of said control mechanism and its connections to the engine throttle.

The drawings illustrate a ratio changing arm secured to a ratio changing shaft and the control mechanism operative thereon, the major portion of which is disposed within the rear of the casing of a race and roller transmission mechanism. The ratio control mechanism is responsive to a governor within the casing rotated by the output end of the transmission, and also to the muscular efforts of an operator, exerted upon an accelerator pedal or equivalent, and transmitted to the control-mechanism by link and lever connections, outside of the casing. They show also the connections of the accelerator pedal to the throttle and the varying relations assumed by throttle and ratio controlling means.

The transmission casing is indicated by numeral 10. Casing 10 has an opening through the upper wall, closed by a removable cover plate 12, and an opening through the rear wall closed by a removable cover plate 14. Access may be had to the inclosed parts through these openings. Cover plate 12 is also equipped with a supporting bearing for an operator controllable primary lever constituting an element of the control mechanism.

One of the driven races of the transmission mechanism is shown at 16, and one of the intermediate adjustable transmission rollers at 18. The transmission output shaft is indicated by numeral 20. The remaining races and rollers, power input devices and final power output elements are not shown, as they are not essential to an understanding of this invention. Inclosure cylinder 22 adjustably secured to shaft 20, by means not shown, is equipped with a collar, 24, rigid with the cylinder, which presses against the inner edge of annular plate spring 26; the outer edge of spring 26 bears against the back of race 16 at 27. Cylinder 22 is normally adjusted axially so as to stress the spring 26 to apply a precalculated elastic pressure to the races and rollers. Within the cylinder 22 are torque loading devices (not shown) for loading the races and rollers in order to increase the traction between them in proportion to increase of load. The torque loading devices and adjusting means referred to are not material to this invention and are fully disclosed in application Serial No. 728,624, filed May 31, 1935, Patent No. 2,030,203 dated February 11, 1936.

The ratio control mechanism of this invention is under the joint influence of the operator, exerted through the usual accelerator pedal or equivalent, and of a governor responsive to the speed of rotation of some part of the transmission train between prime mover and final power take-off, in accordance with the principles and modes of operation disclosed in application Serial No. 521,324, filed March 9, 1931, and application Serial No. 598,350, filed March 12, 1932. In this embodiment the governor is rotated by one of the power output races 16.

Figure 3:
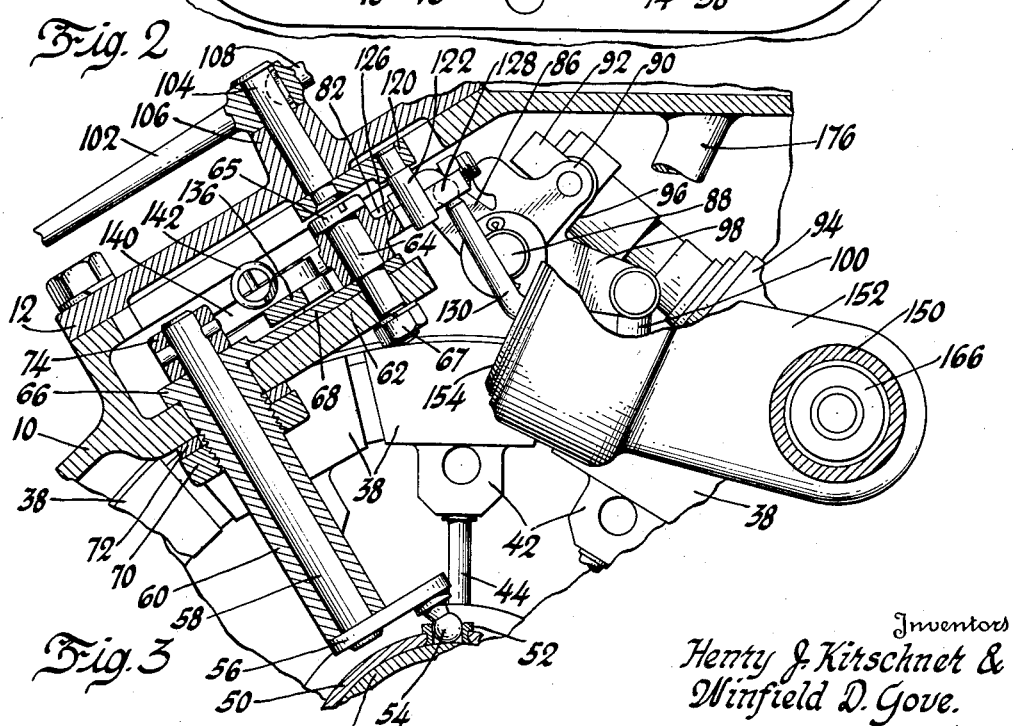
Fig. 3 is a section in a plane indicated by line 3—3 of Fig. 1.
Figure 4:
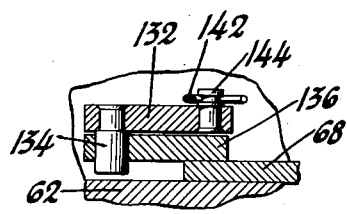
Fig. 4 is a section in a plane indicated by line 4—4 of Fig. 2.

The governor utilized is of a type that is the subject of application Serial No. 712,308, filed February 21, 1934, Patent No. 2,003,817, dated June 4, 1935, and is illustrated sufficiently for the purposes of this invention in Figs. 1 and 3. An annulus or rim member 28 is shown secured to race 16 and overhangs toward the rear. The outer edge of a flat annular spring 30 is secured to the inner periphery of rim 28 by any suitable means that will hold said outer edge from axial movement, but allow the inner edge to yield to axially applied forces. In Fig. 1 spring 30 is shown confined between the edge 32 of a flanged ring 34, welded or otherwise fixed to the back of race 16, and lugs 36 struck-up from rim 28. Fly weights 38 are hooked over the inner edge of spring 30 by means of lugs 40 spaced from the shanks 42 of the fly weights. An arm 44 extends radially inward from each fly weight, its inner end 46 engaging in one of a series of cylindrical sockets formed in ring 48, which rotates with the governor weights and race 16. Sleeve 50 is rotatably coupled to ring 48 as by a swivel coupling 47, and may be moved axially and angularly on cylinder 22. Flyweights 38, when race 16 is rotating, tend under centrifugal force to buckle the spring 30, or pull its inner edge rearward, thus permitting and tending to compel arm 44, and thereby sleeve 50, to move rearward. The spring opposes centrifugal force of the revolving weights and restores the sleeve to the initial position shown in Fig. 1 as soon as the centrifugal pull upon the fly weights becomes less than the elastic force of the spring.

Spring 30 is shown composed of two annular spring layers 30' and 30". Spring layer 30' should be elastically stressed with a bias toward the race 16 in the position shown, thus tending always to oppose the action of centrifugal force on the fly weights 38. Spring layer 30" should be elastically stressed when in the position illustrated with a bias away from race 16 during the initial range of movement of the two layers under the pull of the fly weights, but thereafter, when its normal position of zero stress has been passed, adding its elastic force to that of spring layer 30' to oppose the centrifugal force exerted by the fly weights. The springs may be said to be differentially stressed in order to impart to them a characteristic that permits a low spring resistance and considerable amplitude of movement of the governor arms 44 during relatively low output speed and thereafter applies a greater resistance and a lower ratio of governor arm movement to output speed.

Figure 2:
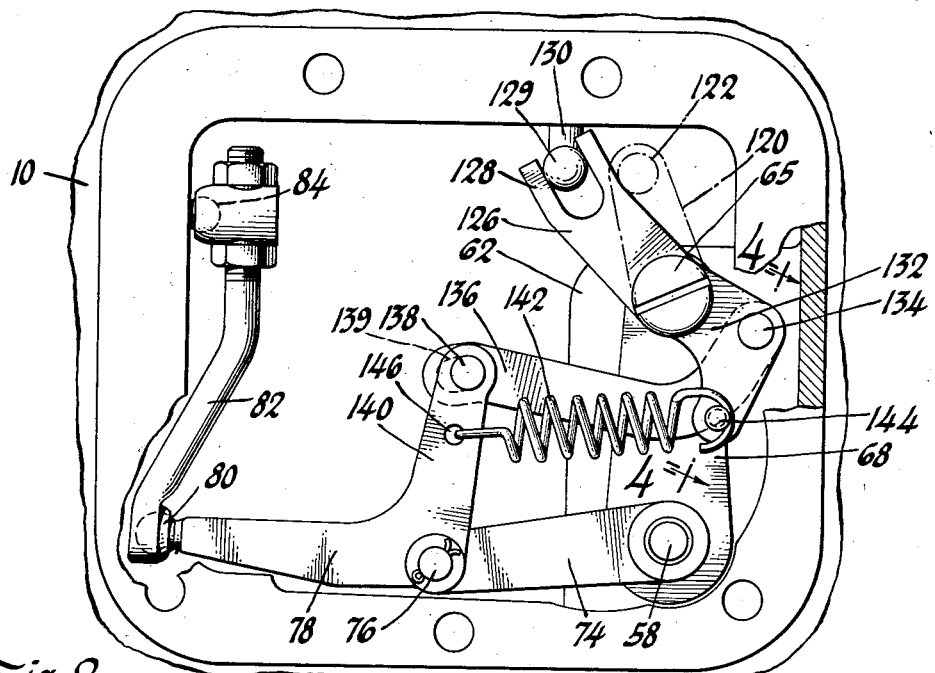
Fig. 2 is a view of certain parts of the control mechanism as seen from above with cover plate removed from the inclosing casing.

The governor influences the ratio control mechanism through the sleeve 50 and associated mechanisms. Sleeve 50 is provided with a cylindrical ball socket at 52 engaged by a ball 54 on a crank pin secured to the end of crank arm 56. Crank arm 56 is secured to the lower end of a rock shaft 58. The latter is rotatably fitted in a long bearing member 60 shown as secured to a shelf-like supporting bracket 62 preferably formed integral with casing 10. The shelf-like bracket 62 is drilled to receive both the bearing member 60 and also a pivot pin 64, as illustrated best in Fig. 3. Bearing member 60 is formed with a head 66 from which projects at right angles a flat arm 68. When the bearing member 60 is properly seated in the hole provided for it in bracket 62, the head 66 and arm 68 lie snugly against the upper face of said bracket, and a smaller hole in the end of the arm registers with a corresponding hole in the bracket so that pin 64, passing through both arm and supporting bracket prevents the former from moving and thus prevents rotation of the bearing member 60. Bearing member 60 is also clamped to bracket 62 by nut 70 and lock washer 72. Secured to the upper end of shaft 58 is an arm 74, supporting a pin 76 on which a balanced or differential lever 78 is fulcrumed, as clearly shown in Fig. 2. The end 80 of one arm of lever 78 is universally jointed to a link 82, the other end of said link being connected by a ball joint 84 to one arm 86 of a two-armed rock lever sleeved on control shaft 88, as best shown in Fig. 3. This arm 86 will be designated the ratio changing arm or device. The other arm 90 of said two-armed rock lever is, in the embodiment illustrated, connected to a member 92 which actuates the control element of a servo motor mechanism 94 of any suitable type, such, for example, as is disclosed fully in application Serial No. 4,220, filed January 31, 1935.

The servo motor, when energized, rocks arm 96, which is secured to shaft 88. Shaft 88 in turning moves arm 98 to which is secured one end of a link 100. Link 100 is connected by intermediate devices, not shown, to the rollers 18 in order to adjust them to different ratio positions.

As this invention is concerned only with the control mechanism on the control-input side of the servo mechanism and ratio changing arm 86, the particular construction of the servo mechanism and of the output control mechanism between control shaft 88, arm 98 and rollers 18, are not shown in detail. They form the subject matter of separate patent applications.

Thus far the means by which a governor is linked with the ratio control arm to impress upon it an influence responsive to speed has been described. The means by which the accelerator lever under the operator's management is connected with the ratio changing device, and the nature of the means whereby both governor and accelerator lever jointly and dependently influence ratio control, will now be described.

The control efforts of the operator upon the transmission ratio are applied to the end 101 of the long power arm of a primary lever 102 disposed outside of casing 10 and fulcrumed on cover plate 12 by means of fulcrum shaft 104 to which lever 102 is keyed as shown in Fig. 3. Shaft 104 has bearing in a hole drilled through a thickened area of the cover plate 12 at boss 106. An extension arm 108 of lever 102 is connected by a strong pull spring 110 to a fixed inchorage lug 112 rising from an attachment 114 bolted to cover plate 12. A stop screw 116 adjustable in lug 118, also rising from attachment 114, acts to limit the extent of movement of arm 108 and lever 102 in the direction of the elastic force exerted by spring 110, that is, counterclockwise as viewed in Fig. 1. A lever work-arm 120 is fixed to the lower end of shaft 104 within casing 10, and a crank pin 122 extending downward is fixed to the end of said arm 120. Lever 102 may be moved clockwise (as viewed in Fig. 1) by an effort of the operator, exerted upon the accelerator pedal or equivalent device, which effort is communicated to the lever through means including a link 124 connected to the end 101 of said lever. A tendency to move counterclockwise is imparted to said lever 102 by spring 110. The mechanism by which the muscular effort of the operator may be transmitted to link 124 and lever 102 will be described hereinafter.

Pin 64, the axis of which is in line with the axis of lever shaft 104, and which has been previously mentioned as passing through arm 68 of bearing sleeve 60 and through shelf-like bracket 62 in order to prevent arm 68 and bearing sleeve 60 from rotating, also functions as a pivot on which a secondary lever 126 is fulcrumed. Pin 64 has a head 65 adapted to confine lever 126 between it and bearing-sleeve arm 68. The lower half of said pin is reduced in diameter, the reduced part extending through said arm 68 and bracket 62, the shoulder formed at the junction between the pivotal bearing part about which the lever rocks and said reduced part resting on said arm 68. The end of the reduced part is threaded for reception of a lock washer and nut 67 to secure pin 64 firmly to bracket 62.

Lever 126 consists of a relatively long arm having a slotted or forked end 28 embracing one end, preferably a spherical terminal 129, of one element 130 of a yieldable resistor to be presently described, and a shorter arm 132, pivoted at 134 to one end of a link 136 the other end of which is connected by a lost motion pivotal joint to arm 140 of said previously mentioned differential lever 78 fulcrumed at 76 on governor moved arm 74. The lost motion joint consists of a pin 138 fixed to arm 140 entering a slot 139 in link 136. At the end of short arm 132 of lever 126, further from the fulcrum than link-connecting pin 134, one end of a tensioned spring 142 is attached, as by a pin 144, the other end of said spring being attached to arm 140 of lever 78, at a point 146, adjacent the connection of link 136 thereto at pivot 138. Upon inspection of Figs. 1 and 2, it will be perceived that said spring 142 not only takes up all backlash and looseness but also acts as a power spring tending to move lever 126 clockwise and press the long arm thereof against pin 122 of arm 120 of the operator controlled lever 102; and that said spring also tends in shortening to rock lever 78 counterclockwise, due to the greater mechanical advantage exerted through arm 132 on the right-hand end of link 136 than on the left-hand end of link 136 through arm 140, and therefore to rotate ratio control arm 86 counterclockwise as viewed in Fig. 3, which adjusts the ratio into low. The elastic force of spring 142, it is to be noted, is less than that of spring 110 connected to lever 102.

Figure 5:
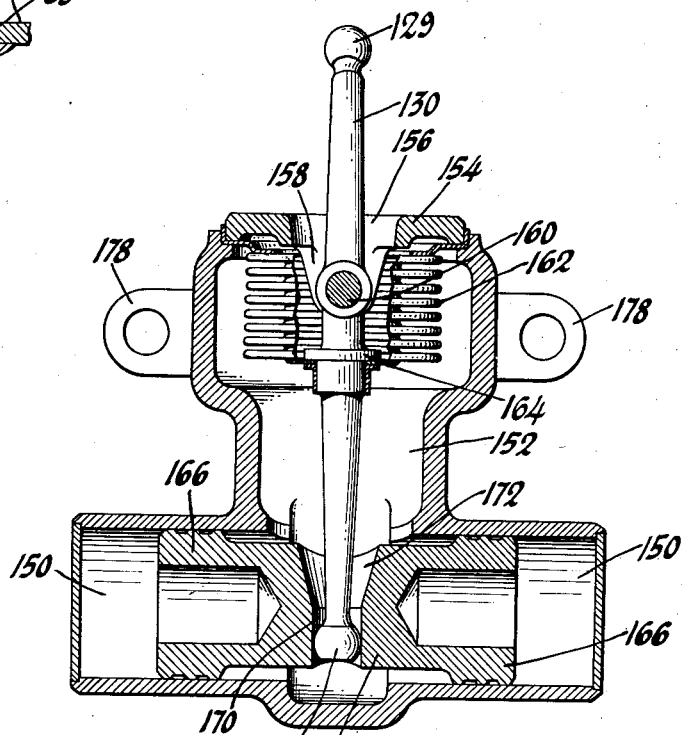
Fig. 5 is a section through a dashpot used to prevent too rapid movement in changing ratio by the operator.
Figure 6:
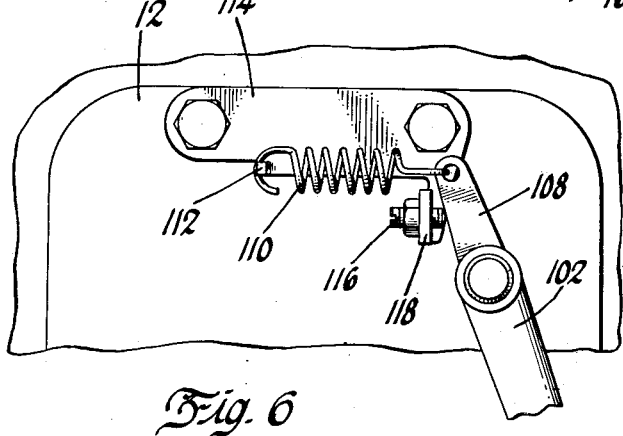
Fig. 6 is a detail plan, showing an operator controlled lever and associated parts external of the casing.

The resistor connected with lever 126 is illustrated in Fig. 5. It consists of a double acting dashpot comprising a liquid tight casing having opposed cylinders 150 and a chamber 152 above and communicating with the cylinders midway between them. The upper part of chamber 152 is somewhat expanded to receive a packing bellows and is closed by a cap piece 154 having a central lever receiving opening 156 and depending spaced lugs 158, between which lever 130, previously referred to as an element of a resistor, is fulcrumed on a pin 160. A packing bellows 162, clamped to the casing by cap piece 154 and sealed to the lever 130 just below collar 164 thereon, renders fluid-tight the opening through which lever 130 enters the casing. Within the cylinders are fitted pistons 166 integrally or otherwise rigidly connected by an intermediate body 168 having a cylindrical opening 170 merging upward into a conoidal throat 172. A spherical terminal 174 of lever 130 operates within cylindrical opening 170 of the intermediate piston body. Between the pistons 166 and cylinders 150 ventways are provided in any suitable manner to permit passage of liquid past the piston. In the construction illustrated the fit of the pistons is loose enough to allow seepage of fluid between them and the cylinder wall when said pistons are moved in either direction. Chamber 152 and the cylinders are designed to contain any oily liquid suitable for dashpots. The dashpot casing may be supported within the transmission casing 10 by brackets 176 to which the dashpot casing may be secured by bolts passing through lateral lugs 178 on said dashpot casing into the brackets 176, which are fast to the transmission casing. The dashpot, it will be perceived, tends to retard movement of the lever 126 by opposing substantially equal resistance to movement of the lever in either sense of swing.

Figure 1B:
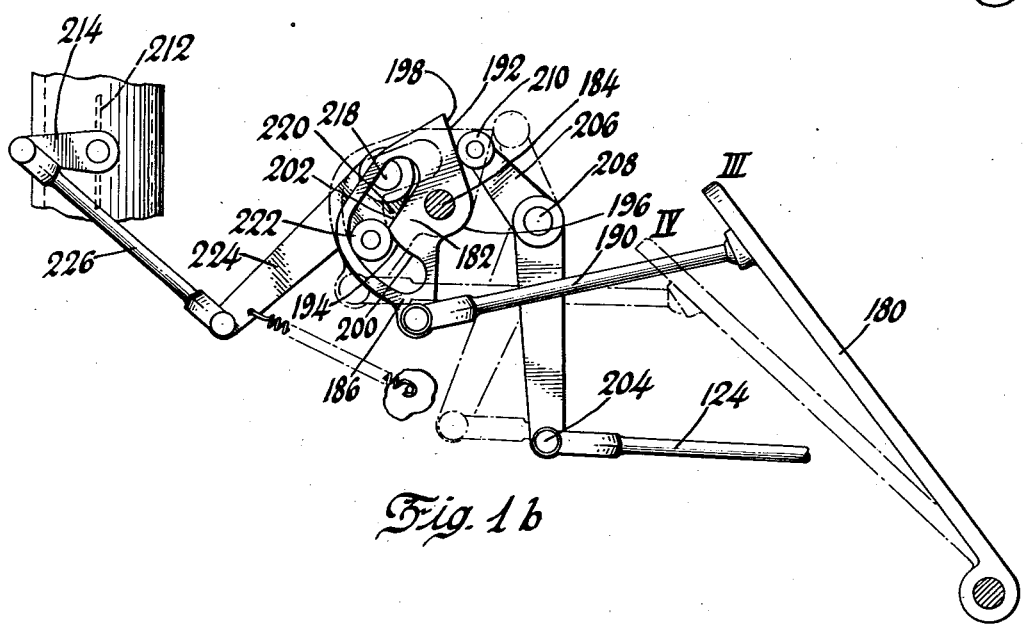
Fig 1b is a view of the mechanism illustrated in Fig. 1a but with the parts shown in different phase relations.

An operator's will may be impressed upon the transmission to adjust the ratio and simultaneously upon the prime mover which drives the transmission by means to be now described. It has previously been explained that the operator's control effort upon the transmission ratio changing mechanism is exerted upon lever 102 through a connection of link 124 to an accelerator pedal or equivalent member. Figs. 1a and 1b show one mechanism for connecting an accelerator pedal 180 to link 124 and to the engine throttle. A cam plate 182 is pivoted to move angularly about a fixed axis 184. Accelerator pedal 180 is shown linked to a projection or arm 186 on the cam plate by rod 190. Cam plate 182 possesses two active cam surfaces 192 and 194. Cam surface 192 is illustrated as formed upon one edge (the upper) of the cam plate and as composed of a delay surface 196 concentric with the axis 184 and a non-concentric activating surface 198. Cam surface 194 is formed as one side of a slot. Cam surface 194 also has a delay or inactive surface 200 concentric with the axis of the cam plate 182 and a non-concentric activating surface 202.

Link 124 is pivoted to the end 204 of the work arm of a lever 206 movable about a fixed fulcrum pin 208. The end of the power arm of lever 206 bears upon cam surface 192, preferably, by means of a roller 210. Roller 210 is elastically urged into contact with cam surface 192 by the spring 110, which tends to swing lever 102 counter-clockwise pulling link 124 toward the right as viewed in Figs. 1, 1a, and 1b, and rocking lever 206 counter-clockwise, thus maintaining roller 210 in contact with cam surface 192. Depression of accelerator pedal 180 has no effect on lever 206 during the initial portion of the depressing movement because of the contact of roller 210 at that time with the delay surface 196 of the cam. During continued depression of the accelerator pedal, when the activating surface 198 comes into contact with roller 210, lever 206 is rocked clockwise as viewed in Figs. 1a and 1b, pulling link 124 leftward, rocking lever 102 clockwise against the resistance of spring 110, and causing pin 122 of arm 120 to free lever 126 so that said pin does not prevent clockwise movement of lever 126.

A throttle of ordinary butterfly valve type is diagrammatically indicated at 212. It is rotatable by force applied to an attached arm 214 and is biased preferably toward closed or engine idling position by a spring. A two-armed lever pivoted to a fixed fulcrum pin at 218 has a relatively short power arm 220 provided preferably with a terminal roller 222 bearing against the cam surface 194 of the cam slot in cam plate 182. The relatively longer work arm 224 of said lever fulcrumed at 218 is tied by a link rod 226 to the throttle arm 214. The early portion of the depression movement of accelerator pedal 180 causes the active cam surface 202 to rock lever 220, 224, thus opening the throttle 212. After cam plate 182 has been moved by accelerator 180 to a degree that brings delay cam surface 200 into engagement with roller 222 on power arm 220 of lever fulcrumed at 218, further depression of accelerator pedal 180, has no effect upon the throttle, but does move lever 206 clockwise pulling link 124 leftward and rocking lever 102 clockwise.

The drawings, Figs. 1, 1a, 2, and 3 show the power transmitting elements in low ratio relation, the engine throttle closed, the accelerator pedal fully released, and all other parts of the ratio control mechanism in corresponding low ratio position.

Assuming the engine to have been started and the transmission train coupled to it, the accelerator pedal 180 is depressed as is usual in starting or accelerating motor vehicles. Depression of the accelerator pedal rotates cam plate 182 clockwise and moves the throttle toward fully open position. Assuming pedal 180 to have been moved from position I, as indicated on the diagram Fig. 1a, to position II, arm 186, fixed to cam plate 182, will have been rotated to corresponding position II; arm 224 and throttle-valve arm 214 will also have been moved to position II in their respective arcs of movement. The governor will have shifted ratio changing arm 86 to a higher ratio position by swinging arm 74 clockwise (Fig. 3) and thus moving said arm 86 toward high ratio position. The car may be assumed now to be traveling at a rate of 50 to 60 miles per hour, the speed of the car during the range of accelerator movement from position I to position II, having been controlled by the combined effect of throttle opening and governor control of the ratio changing arm 86. The effort of the operator on the accelerator pedal has had no effect upon the ratio changing arm 86 because throughout the range of movement of pedal 180 from position I to position II the delay surface 196 of cam 192 has been in contact with roller 210 on lever 206 so that lever 206 has imparted no movement to link 124 and arm 102, which transmits the operator's muscular effort to the control mechanism.

If pedal 180 be moved to position III, (Fig. 1b) cam-plate arm 186 will be moved to corresponding position III and this movement of the cam plate will swing arm 224 to position III on its arc of movement, which will in turn move the throttle valve arm 214 to corresponding position III. Position III of the throttle is shown as the wide open position. At this position roller 222 on lever arm 220 is at the turn or corner of the cam slot or cam surface 194. Any further swing of the cam plate clockwise can impart no movement to the throttle because the delay surface 200 then contacts with said roller 222. The movement of pedal 180 from position II to position III has moved the lower end 204 of lever 206 to corresponding position III on its arc of movement. The engine has now accelerated and the governor has tended to move the arm 74 further clockwise. But the movement of arm 206 to position III has pulled the link 124 and swung lever 102 clockwise, thus removing pin 122 rightward (Figs. 1 and 2) away from lever 126. Spring 142 now contracts, pulling lever 126 clockwise against dashpot resistance and imparting a differential movement to lever arms 132 and 140 the result of which is a counter-clockwise movement of the differential lever 78 and a forcing of ratio control arm 86 toward a lower speed ratio position. This change of ratio affording higher mechanical advantage with wider throttle opening allows the engine to attain a higher velocity, while the transmission ratio is now under operator control.

If now the accelerator be pressed down to position IV (Fig. 1b), cam-plate attached arm 186 moves to corresponding position IV. As delay surface 200 now contacts with roller 222 on arm 220, arm 224 can move no further leftward (Fig. 1b) and throttle position does not change; but the lower end 204 of lever arm 206 moves leftward to position IV on its arc of movement and pulls link 124 leftward and lever 102 clockwise, thus removing pin 122 still further rightward (Fig. 2) and allowing spring 142 to pull lever 126 clockwise against dashpot resistance until it again bears against pin 122, and the differential movement of arms 132 and 140 again results in a counterclockwise movement of differential lever 78, and a tendency to move ratio control arm 86 again toward low ratio position. Thus with reduced ratio the engine may speed up to its peak efficiency. And when that peak has been reached the governor will by moving ratio control arm toward a higher ratio position prevent the engine from exceeding the velocity of peak efficiency.

In order to limit the extent of possible tilt of rollers 18 during change of ratio position stops (not shown) are provided to limit the angular movement of arms 86 and 90. Should the governor attain a speed under any condition of car driving sufficient to tend to cause tilting of the rollers to the limit of high ratio position, the differential lever 78 may then fulcrum on its end joint 80, allowing pin 138 in the end of arm 140 to move around pin 76 leftward (Fig. 2) in the slot in link 136, resisted by spring 142.

If pressure on pedal 180 is relaxed so that it rises and enters the range between positions II and III, the throttle partially closes and spring 110 moves lever 102 counter-clockwise, moving pin 122 leftward (Figs. 1 and 2) against dashpot resistance thereby rocking differential lever 78 clockwise, and so tending to shift to a higher gear ratio. Thus reducing the fuel supply of the engine and increasing the load upon it by introducing a higher gear ratio tends to slow the car speed. Further relaxation of pressure on pedal 180 reduces still more the fuel supply and permits spring 110 acting on lever 102 to press lever 126 further in a counter-clockwise sense thus tending still further to maintain a high transmission ratio, and so slowing down the engine and vehicle speed. When pedal 180 is between positions I and II the governor influences ratio in cooperation with the operator's effort. The governor tends during diminishing vehicle speed to lower ratio while the effort of spring 110 (regulated by the operator) tends to raise the ratio. When the vehicle comes to a stop the governor has assumed the position shown in the drawings and has adjusted the rollers to low ratio position, suitable to allow the car to be started again.

We claim:

1. In a variable speed transmission mechanism of the kind described, a ratio changing device, a speed responsive governor, a differential member movable by the governor, means for connecting the differential member to the ratio changing device, an operator-controllable device, a mechanical connection between said differential member and said operator-controllable device, and a spring connected to said differential member and said operator controllable device tending to shorten the distance between said member and device at the points of connection of said spring.

2. In a variable speed transmission mechanism of the kind described, a ratio changing device, a differential lever, a governor influenced element pivoted to said differential lever between the ends of the latter, a connection from one arm of said differential lever to said ratio changing device, a pivoted operator-controllable arm link-connected to the other arm of said differential lever, and a take-up and power spring connected to said link-connected arms at points which enable the spring to operate with a greater mechanical advantage on one arm than on the other.

3. In a variable speed transmission mechanism, a combination as defined in claim 2 wherein the take-up and power spring is connected to said link-connected arms at points which enable the spring to operate with greater mechanical advantage on the operator-controllable arm than on the differential lever.

4. In a variable speed transmission mechanism, a combination as defined in claim 2 in which the take-up and power spring is connected to the differential lever between the link connection thereto and the pivotal connection thereof to the governor influenced element, and to the operator-controllable arm at a greater distance from the fulcrum of the latter than the link connection.

5. In a variable speed transmission mechanism of the kind described, a ratio changing device, a differential bell crank lever, a governor operated member to which said bell crank member is pivoted at the angle of the latter, a mechanical connection between the ratio changing device and one arm of said differential lever, an operator-controllable arm, a link connecting said operator controllable arm to the other arm of said differential lever, and a spring having its ends joined to said link-connected arms at points that enable the spring to operate with a greater mechanical advantage on one arm than on the other.

6. In a variable speed transmission mechanism of the kind described, a ratio changing device, a differential bell crank member, a governor-operated member to which said differential member is pivoted between its ends, means for mechanically connecting one arm of said differential member to said ratio changing device, said governor-operated member being constrained to move its pivotal connection with the differential member toward and away from said ratio changing device and operator-controllable means including a spring arranged to apply its elastic force to the other arm of said differential member in a direction substantially at right angles to the direction of the force applied thereto by the governor-operated member.

7. In a variable speed transmission mechanism of the kind described, a ratio changing device, a differential lever connected thereto, a movable member to which said differential lever is pivoted between its ends, a governor for operating said movable member and thereby changing the position of the pivotal connection between said differential lever and said movable member, and operator-controllable means including a spring exerting its tension to rock said differential lever on said pivotal connection.

8. In a variable speed transmission mechanism of the kind described, a ratio changing device, a speed responsive governor, a differential member, means for transmitting movement from the governor to the differential member, means for connecting the differential member to said ratio changing device, operator-controllable means including a primary lever, and a secondary lever, said primary lever having means arranged to contact with the secondary lever in one sense of movement only, a spring tending to move said primary lever in the sense of direction which causes it to engage with the secondary lever, a link connecting one arm of the secondary lever with said differential member, a take-up and power spring connected to said differential member and to said arm of said secondary lever, the elastic force of said take-up and power spring being inferior to that of the spring acting on said primary lever.

9. In a variable speed transmission mechanism of the kind described, a ratio changing device, a speed responsive governor, a differential member, means for transmitting movement from the governor to the differential member, means for connecting the differential member to said ratio changing device, operator controllable means including a lever, a link connecting one arm of said lever with the differential member, a take-up and power spring connected to said differential member and to the link connected arm of said lever.

10. In a variable speed transmission mechanism of the kind described, a ratio changing device, a speed responsive governor, a differential lever, means connected to said differential lever between its ends for transmitting movement thereto from the governor, means for connecting one arm of said differential member to said ratio changing device, operator controlled means including a primary lever, a secondary lever, means whereby movement of the primary lever in one sense of direction compels movement of the secondary lever in one sense only, yieldable means for biasing said primary lever to cause movement of the secondary lever, a link having a lost motion connection from one arm of said secondary lever to an arm of said differential lever, a tensioned spring between the link-connected arms of said differential lever and said secondary lever, said spring exerting less force than said yieldable means for biasing the primary lever, and arranged so as to exert its elastic force with a greater mechanical advantage on said secondary lever than on the differential lever.

11. In a variable speed transmission mechanism of the class described, a combination as defined in claim 10 with the addition of a yieldable resistor arranged to retard movement of the operator controllable means.

12. In a variable speed transmission mechanism of the kind described, a ratio changing device, a differential lever connected to said ratio changing device, a movable member to which said differential lever is pivoted, a governor operative on said movable member for changing the position of the pivotal connection between said differential lever and said movable member, a pivoted operator controllable arm, a link connected to the differential lever and said operator controllable arm, a spring joined to said arm and said differential lever at points that enable the spring to operate with a greater mechanical advantage on said arm than on said differential lever, and a yieldable resistor tending to retard the movement of said arm.

13. In a variable speed transmission mechanism of the kind described, a ratio changing device and means for limiting its range of movement, a speed responsive governor, and mechanical connections between the governor and ratio changing device including cushioning means.

14. In a variable speed transmission mechanism of the kind described, a ratio changing device, a differential member connected to the ratio changing device, a speed responsive governor connected to the differential member and exerting a force tending to shift the ratio changing device toward high speed ratio in response to increasing governor speed and toward low-speed ratio in response to decreasing governor speed, and an operator controllable spring connected to said differential member, said spring being stressed to exert its elastic force upon the differential member with a tendency to adjust the ratio changing device toward low-speed ratio position.

15. In a variable speed transmission mechanism of the kind described, a ratio changing device, a differential member having one end connected to the ratio changing device, a speed responsive governor operative on the differential member between its ends, an operator movable member, a link having a lost motion connection to said operator movable member and to the other end of said differential member, and a take-up and power spring tending by exerting its elastic force to shorten the distance between said members, said spring being joined to said members at points removed from the link connections thereto.

HENRY J. KIRSCHNER.
WINFIELD D. GOVE.